US009647777B2

(12) United States Patent
Wang

(10) Patent No.: US 9,647,777 B2
(45) Date of Patent: May 9, 2017

(54) ICEBREAKER ACTIVITIES USING AN INTELLIGENT BEVERAGE CONTAINER

(71) Applicant: Anheuser-Busch InBev, New York, NY (US)

(72) Inventor: Winston Wang, San Francisco, CA (US)

(73) Assignee: Anheuser-Busch InBev, New York, NY (US)

( * ) Notice: Subject to any disclaimer, the term of this patent is extended or adjusted under 35 U.S.C. 154(b) by 661 days.

(21) Appl. No.: 13/972,679

(22) Filed: Aug. 21, 2013

(65) Prior Publication Data

US 2014/0059133 A1  Feb. 27, 2014

Related U.S. Application Data

(60) Provisional application No. 61/691,609, filed on Aug. 21, 2012, provisional application No. 61/691,617, (Continued)

(51) Int. Cl.

| H04H 20/63 | (2008.01) |
|---|---|
| B67C 3/00 | (2006.01) |
| H04L 29/08 | (2006.01) |
| H04H 60/33 | (2008.01) |
| B67D 7/34 | (2010.01) |
| B67D 1/00 | (2006.01) |
| B67D 1/08 | (2006.01) |

(Continued)

(52) U.S. Cl.
CPC ............ *H04H 20/63* (2013.01); *B67C 3/007* (2013.01); *B67D 1/0005* (2013.01); *B67D 1/0872* (2013.01); *B67D 7/348* (2013.01); *G07F 7/0609* (2013.01); *G07F 13/02* (2013.01); *G07F 13/025* (2013.01); *H04H 60/33* (2013.01); *H04L 67/22* (2013.01); *B67D 1/0888* (2013.01); *B67D 1/0894* (2013.01); *B67D 2001/0811* (2013.01); *B67D 2001/0812* (2013.01); *B67D 2210/00083* (2013.01); *B67D 2210/00089* (2013.01); *B67D 2210/00091* (2013.01)

(58) Field of Classification Search
None
See application file for complete search history.

(56) References Cited

U.S. PATENT DOCUMENTS

| 6,297,853 B1 | 10/2001 | Sharir et al. |
|---|---|---|
| 7,444,659 B2 | 10/2008 | Lemmons |

(Continued)

*Primary Examiner* — Kathleen Palavecino
*Assistant Examiner* — Andrew Whitaker
(74) *Attorney, Agent, or Firm* — Holland & Hart, LLP

(57) ABSTRACT

Systems, devices, and methods are provided for conducting a social interaction. A first user account may be associated with a first beverage container. A second beverage container may be detected as being proximate to the first beverage container. A second user account associated with the second beverage container may be accessed to identify a commonality between the first and second user accounts. The commonality may be objective and/or subjective information or data about the users of the first and second beverage containers. Information indicative of the commonality may be displayed on an electronic display of at least one of the beverage containers. The electronic display may be flexible such that it conforms to a curvature of the beverage container.

16 Claims, 12 Drawing Sheets

Related U.S. Application Data filed on Aug. 21, 2012, provisional application No. 61/691,618, filed on Aug. 21, 2012, provisional application No. 61/691,622, filed on Aug. 21, 2012, provisional application No. 61/691,627, filed on Aug. 21, 2012, provisional application No. 61/691,630, filed on Aug. 21, 2012.

(51) Int. Cl.
  *G07F 7/06* (2006.01)
  *G07F 13/02* (2006.01)

(56) References Cited

U.S. PATENT DOCUMENTS

| | | | |
|---|---|---|---|
| 8,341,669 B2 | 12/2012 | Lau et al. | |
| 8,350,871 B2* | 1/2013 | Gyorfi | H04W 4/00 345/633 |
| 8,618,448 B2* | 12/2013 | Alexander | A47G 19/2288 165/58 |
| 8,759,721 B1* | 6/2014 | Alexander | A47G 19/2288 165/58 |
| 8,839,343 B2 | 9/2014 | Wang | |
| 2006/0087831 A1* | 4/2006 | Kramer | A47G 19/025 362/101 |
| 2010/0045705 A1* | 2/2010 | Vertegaal | A47G 19/2227 345/661 |
| 2010/0182518 A1* | 7/2010 | Kirmse | G06F 1/1626 348/836 |
| 2010/0280904 A1* | 11/2010 | Ahuja | G06Q 30/02 705/14.58 |
| 2011/0049180 A1* | 3/2011 | Carpenter | B67D 1/0022 222/1 |
| 2011/0252099 A1* | 10/2011 | Pattekar | G06F 17/30371 709/206 |
| 2011/0265806 A1* | 11/2011 | Alarcon | A24F 47/00 131/273 |
| 2011/0292299 A1 | 12/2011 | Lau et al. | |
| 2011/0320536 A1* | 12/2011 | Lobb | G06Q 50/01 709/205 |
| 2012/0158531 A1* | 6/2012 | Dion | G06Q 10/10 705/26.1 |
| 2014/0041558 A1* | 2/2014 | Lubotta | E05G 1/10 109/38 |
| 2014/0053944 A1 | 2/2014 | Wang | |
| 2014/0059581 A1 | 2/2014 | Wang | |
| 2014/0081777 A1* | 3/2014 | Mastrodonato | G06Q 50/12 705/15 |
| 2015/0248651 A1* | 9/2015 | Akutagawa | G06Q 10/1095 705/7.19 |
| 2016/0022209 A1* | 1/2016 | Fraisl | A61B 5/0024 600/590 |

* cited by examiner

ICEBREAKER ACTIVITIES USING AN INTELLIGENT BEVERAGE CONTAINER

CROSS-REFERENCE TO RELATED APPLICATION(S)

The present application claims the benefit of and priority to U.S. Provisional Patent Application Ser. No. 61/691,609 entitled "BEVERAGE CONTAINER WITH INTEGRATED ELECTRONIC DISPLAY," filed Aug. 21, 2012; to U.S. Provisional Patent Application Ser. No. 61/691,617 entitled "BEVERAGE CONTAINER WITH DYNAMIC LABEL," filed Aug. 21, 2012; to U.S. Provisional Patent Application Ser. No. 61/691,618 entitled "STATE-BASED CONTAINER MANAGEMENT," filed Aug. 21, 2012; to U.S. Provisional Patent Application Ser. No. 61/691,622 entitled "SOCIAL ACTIVITIES USING INTELLIGENT BEVERAGE CONTAINERS," filed Aug. 21, 2012; to U.S. Provisional Patent Application Ser. No. 61/691,627 entitled "CENTRALLY COORDINATED SOCIAL ACTIVITIES USING INTELLIGENT BEVERAGE CONTAINERS," filed Aug. 21, 2012; and to U.S. Provisional Patent Application Ser. No. 61/691,630 entitled "ACCOUNT-BASED MANAGEMENT OF INTELLIGENT BEVERAGE CONTAINERS," filed Aug. 21, 2012; of which the entirety of each application is incorporated herein by reference.

BACKGROUND

The present invention relates to methods and system performing interactive social activities using an intelligent beverage container.

Beverage containers are ubiquitous. While some beverage containers (e.g., aluminum cans) are designed to be used once and then recycled, other types of beverage containers (e.g., glasses, chalices, bottles, etc.) may be refilled and reused many times. Nevertheless, the labels on most refillable beverage containers contain images or text permanently printed on a paper or plastic medium or permanent markings on the material of the beverage container itself. Thus, even though a beverage container may be refilled with multiple different beverages, no solution exists for dynamically updating the label of the beverage container.

Additionally, beverages are often consumed during social gatherings. In such social gatherings, people may use their beverage containers to enhance social interactions or to express emotion. For example, two people may tap beer bottles together as an expression of goodwill or friendship. In another example, a spectator of a sporting event may raise a bottle to express solidarity with a team. Currently, there is no way for the beverage containers to enhance social interactions to help strangers or new acquaintances at the event to get to know each other. For example, there is no known method for the beverage container to provide an incentive or basis for strangers to break the ice. What is needed, then, is a beverage container that can enhance social interactions and the overall experience of consuming a drink and allow strangers or new acquaintances find common ground for discussion.

SUMMARY

According to a first set of illustrative examples, a method is provided. The method may include associating a first user account with a first beverage container; detecting a second beverage container being in proximity with the first beverage container; accessing a second user account associated with the second beverage container to identify a commonality between the first and second user accounts; and displaying information indicative of the commonality on at least one of the first or second beverage containers. The method may also include detecting the first and second beverage containers being in substantial physical contact with each other; and transmitting, based on the substantial physical contact, a connection request to the second user account to connect the second user account with the first user account. The connection request may be a friend request via an online social network. Connecting the second user account with the first user account may share a limited portion of information about a first user associated with the first user account with a second user associated with the second user account.

According to some examples, the first and second user accounts may be associated with one or more online social networks. The method may also include: accessing the first and second user accounts to identify additional commonalities; and displaying information indicative of at least one of the additional commonalities on at least one of the beverage containers. The information indicative of the additional commonalities may be displayed after a predetermined time period of the first and second beverage containers being in proximity. The method may also include updating the display of information indicative of the additional commonalities to illustrate a different commonality after a predetermined time period.

In some examples, the commonality may include one or more of a home town, a visited location, an acquaintance, a school, a sports team, a present or former employer, an organization membership, an interest, a common activity, a membership in an online social network, a beverage choice, or a purchase history. Further, detecting the proximity may include detecting the second beverage container via a wireless signal. The wireless signal may be transmitted via a wireless communications module in each of the first and second beverage containers.

According to a second set of illustrative examples, an apparatus for conducting a polling event is provided. The apparatus may include: a processor; a memory in electronic communication with the processor; and instructions being executable by the processor to, associate a first user account with a first beverage container; detect a second beverage container being in proximity with the first beverage container; access a second user account associated with the second beverage container to identify a commonality between the first and second user accounts; and display information indicative of the commonality on at least one of the first or second beverage containers. The instructions may be further executable by the processor to: detect the first and second beverage containers being in substantial physical contact with each other; and transmit, based on the substantial physical contact, a connection request to the second user account to connect the second user account with the first user account.

In some examples, connecting the second user account with the first user account may share a limited portion of information about a first user associated with the first user account with a second user associated with the second user account. The first and second user accounts may be associated with one or more online social networks. The instructions may be further executable by the processor to: access the first and second user accounts to identify additional commonalities; and display information indicative of at least one of the additional commonalities on at least one of the beverage containers.

According to a third set of illustrative examples, a central server computer system is provided. The central server computer system may be configured for conducting a social interactivity and include: a user mapping module configured to associate a first beverage container with a first user account and a second beverage container with a second user account, the user mapping module further configured to determine whether the first and second beverage containers are in proximity; a social network interface module configured to retrieve information related to the first and second user accounts based on the first and second beverage containers being in proximity; and a user comparison module configured to compare the information related to the first and second user accounts to determine at least one commonality.

In some examples, the central server computer system may also include: a communications module in wireless communications with the first and second beverage containers and configured to transmit a message to the beverage containers to cause an electronic display integrated into the beverage containers to display information indicative of the at least one commonality. The central server computer system may also include: a connection module configured to transmit a connection request to the first and second user accounts based on a determination that the first and second beverage containers being in substantial physical contact.

In some examples, the connection request may be a friend request via an online social network. The first and second user accounts may be associated with one or more online social networks. The social network interface module may be further configured to access the first and second user accounts to identify additional commonalities and the user comparison module is further configured to cause information indicative of at least one of the additional commonalities to be displayed on at least one of the beverage containers. The information indicative of the additional commonalities may be displayed after a predetermined time period of the first and second beverage containers being in proximity.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
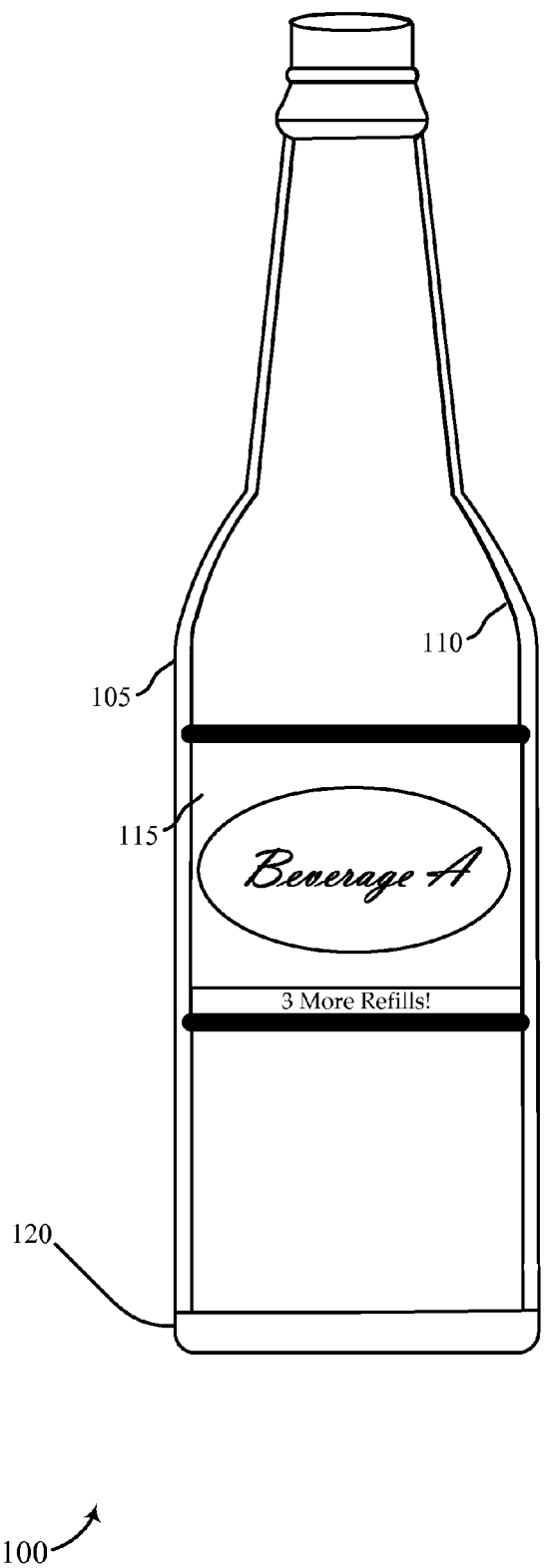
FIG. 1 is a diagram of an example beverage container with an integrated display according to various embodiments of the invention.

Methods, systems, and devices are disclosed for social interaction activities that utilize an intelligent beverage container. In one set of examples, communication may be established between a central server computer system and a plurality of intelligent beverage containers. The beverage containers may each be in wireless communication with the central server computer system to exchange data, identification, or other information. The beverage containers may include an electronic display that can be dynamically changed. Each of the beverage containers may be associated with a user account for the user of the beverage container. The central server computer system may detect the location of beverage containers and access data from the user accounts associated with the beverage containers. The central server computer system may determine that at least two of the beverage containers are proximate to each other. The central server computer system may access the user accounts associated with the two beverage containers to determine a commonality between the first and second user accounts. Information indicative of the commonality may be displayed on one or both of the proximate beverage containers.

According to certain examples, the intelligent beverage containers may include one or more integrated position/orientation sensing devices (e.g., accelerometer, gyroscope, GPS, etc.). The information from the sensing devices may determine the location of the beverage container and also can determine when the user gestures with the beverage container. For example, the sensing devices may detect and provide an output signal indicative of the location of the user within a predefined area and to a predetermined resolution (e.g., within one foot). The central server computer system may track the location of each beverage container within the predefined area and determine when a first and a second beverage container are proximate to each other. Based on information stored in the user accounts with each beverage container, the central server computer system may determine one or more commonalities between the users of the beverage containers and generate a message indicative of the commonality. The message may be transmitted to at least one of the beverage containers to change an electronic display on the beverage container to indicate the commonality.

According to certain examples, the central server computer system may determine one or more of whether the users lived/live in the same location, attended the same school, have a common friend, vacationed at the same location, work(ed) at the same location, share a birthday, drive a similar vehicle, purchased a similar product, share a common interest/hobby, etc. As can be appreciated, by mining and comparing information from the associated user accounts for each beverage container, the central server computer system can determine a wide variety of common characteristics the users share. The commonalities do not have to be an exact match though, i.e., the users may have lived in adjoining towns or work within a similar industry but for different companies. By determining the commonalities and informing each user via the displays on their respective beverage containers, the central server computer system may institute a social interaction between the users of the first and second beverage containers. Utilizing aspects of the present disclosure, the users of the beverage containers may use the commonality as an icebreaker to strike up a conversation and get to know each other.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

As used herein, the terms "hot-swappable" generally refers to the characteristics of an electronic module as defined by the ability to quickly remove and replace the electronic module with little or no down time. By way of example only, an electronic module that is hot swappable may be inserted, added, removed, and the like, without requiring disrupting a power source and/or an associated module.

Systems, devices, methods, and software are described for social interaction activities using a central server computer system in communication with a plurality of beverage containers.

FIG. 1 illustrates an example intelligent beverage container 100. In the example of FIG. 1, the beverage container 100 is a bottle. However, it should be understood that the principles of the present disclosure may also be applied to other types of beverage containers, including but not limited to glasses, cups, cans, mugs, pitchers, tumblers, chalices, and the like.

The intelligent beverage container 100 may include an outer surface 105 and an inner surface 110. The outer surface 105 may generally define the shape of the beverage container 100, and the inner surface 110 may define the area that holds the beverage. An electronic display 115 may be disposed between the outer surface 105 and the inner surface 110. Alternatively, the electronic display 115 may be disposed on the outer surface 105 of the beverage container 100. Generally, the electronic display 115 may sized and shaped so as to conform to at least a portion of the beverage container 100. The electronic display 115 may be shaped such that the display area of the electronic display 115 conforms to a curvature of the beverage container 100. When the electronic display 115 is disposed between the inner surface 110 and the outer surface 105, at least a portion of the outer surface 105 of the beverage container 100 may be transparent or translucent such that the electronic display 115 is visible from the outside of the beverage container 100.

In certain examples, the curved electronic display 115 may be a thin organic light-emitting diode (OLED) display formed on a flexible polymer or other substrate such that the display area of the electronic display 115 may be flexed according to the curvature of the circumference of the beverage container 100. However, it should be understood that the principles of the present disclosure may also be applied to other types of flexible electronic displays, including, but not limited to active matrix light-emitting diode (AMOLED), passive-matrix OLED, and the like. In certain examples, the curved electronic display 115 may be a 360 degree display such that the display area of the electronic display 115 forms a substantially continuous display area around the circumference of the beverage container 100.

Alternatively, or in addition to the electronic display 115, the beverage container 100 may also comprise one or more light sources (e.g., light-emitting diodes (LEDs)) positioned around the circumference and/or length of the beverage container 100. The light sources may be disposed between the inner surface 110 and the outer surface 105 of the beverage container. Each, or some of the light sources may emit light at one or more colors. The light sources may be used to attract the user's attention to the fact that a user with a commonality is nearby.

In certain examples, the beverage container 100 may be a double-walled container in which a first wall forms the inner surface 110, a second wall forms the outer surface 105, and the curved electronic display 115 is disposed intermediate the first and second walls. The first and second walls may be made of the same or different materials. For example, in one embodiment the first and second walls may be made out of glass. In another example, the first wall may be made out of glass and the and second wall may be made out of plastic.

The beverage container 100 may further include one or more electronics module 120 configured to house control circuitry for the beverage container 100. For example, at least one electronics module 120 may include control circuitry for the curved electronic display 115. Additionally, at least one electronics module 120 may include one or more processors, memory, accelerometers, gyroscopes, wireless devices (e.g., Wireless Local Area Network (WLAN), Radio Frequency Identification (RFID), Near Field Communications (NFC), Global Positioning System (GPS)), or other input/output devices that may suit a particular application of the principles of the present disclosure. Using these electronic components in the electronics module(s) 120 coupled with the curved electronic display 115, a user of the beverage container 100 may interact with a computer network to enhance and augment the experience of social interactions.

In certain examples, one or more electronics module 120 of the beverage container 100 may be selectively removable and replaceable. For example, an electronics module 120 may house a battery or other power supply that may be selectively replaced to ensure substantially continuous up time for the curved electronic display 115. Additionally or alternatively, an electronics module 120 may house electronic memory that may be selectively replaced when the electronic memory is filled with data. In certain examples one or more of the electronics module 120 may be hot-swappable such that the curved electronic display 115 or other electronic components of the beverage container 100 remain on for all or substantially all of the time during the replacement of the module(s) 120.

In certain examples, the beverage container 100 may include a refill conduit 125 configured to interface with a refill station and refill the beverage container 100. In certain examples, electronics module 120 may be shaped such that the refill conduit 125 passes through the electronics module 120.

While the beverage container 100 shown in FIG. 1 may contain a number of integrated electronics module(s) 120, it will be understood that in certain examples at least some of the electronic functionality of the beverage container 100 shown in FIG. 1 may be implemented in a separate device. For example, one or more of the electronics module 120 may be implemented in a mobile phone or other device that wirelessly communicates with the beverage container 100 to control the curved electronic display 115 or another aspect of the beverage container 100. Additionally or alternatively, a special-purpose device may be provided separately from the beverage container such that the special-purpose device contains one or more of the electronics module 120 and communicates with the beverage container 100 to control the curved electronic display 115 or another aspect of the beverage container 100.

The present disclosure describes various embodiments of beverage containers 100 configured to perform a number of different functions. However, in light of the foregoing description, it will be understood that a functionality described herein as being performed by the beverage container 100 may, in other embodiments, be performed by a device or module external to the beverage container 100. Such a device or module may communicate with the beverage container 100 to achieve the same or a similar effect as the beverage container 100 performing that functionality.

In certain examples, the integrated curved electronic display and other electronic components of the beverage container 100 may enable a user of the beverage container 100 to participate in social interaction activities managed by a central server computer system. For example, a central server computer system may communicate with the number of beverage containers 100 to implement a variety of social interaction activities. The central server computer system may receive input from the beverage containers 100, from a user account associated with the beverage container, etc., and control the beverage containers 100 to display certain images or text in response and during the course of the social interaction.

According to certain embodiments, a central server computer system may associate one or more beverage containers 100 with a corresponding user account. The user account may be locally stored in a user database and/or may be associated with one or more online social networks. Accordingly, the central server computer system may determine one or more facts, traits, interests, etc., about the user of the beverage container 100.

The central server computer system may also detect a plurality of beverage containers 100 at a particular location and where, in particular, within the location the beverage containers are located, i.e., down to a predefined radius. The central server computer system may detect the beverage containers 100 in a variety of ways. In some examples, the beverage containers 100 may comprise a GPS and a wireless device in the electronics module 120. The beverage containers 100 may communicate location data via the wireless device to the central server computer system such that the beverage containers 100 are detected. According to some examples, the central server computer system may comprise a one or more micro-wireless network that covers a small area. As beverage containers 100 arrive and connect to the wireless network, the central server computer system detects the beverage containers 100 based on the connection being established. Other exemplary methods of determining a specific location of the beverage containers may also be used.

Once detected, the central server computer system may transmit messages to the beverage containers 100 to update or change the information being displayed on the electronic display 115. The central server computer system may change the information displayed on the electronic displays 115 of the beverage containers 100 in real time, i.e., to instigate or enhance a social interaction amongst at least two of the detected beverage containers 100. For example, the central server computer system may, at a sports bar, transmit one or more messages to each of the beverage containers 100 to cause the electronic display 115 to show information such as the score, the period/quarter/time, possession, fouls, penalties, etc. As shown in FIG. 1, the central server computer system may additionally, or alternatively, cause the electronic displays 115 to display when a team scores. As another example, the central server computer system may, at a concert event, transmit one or more messages to each of the beverage containers 100 to cause the electronic display 115 to show information related to a song (e.g., title, year released, the song lyrics, etc.), information related to the band or band members, upcoming concert dates, etc. In some examples, the central server computer system may cause the electronic displays 115 to display a solid color where the color can be changed based on social activities.

According to certain embodiments related to interactive social activities, the central server computer system may determine when at least two of the beverage containers 100 are within a predefined proximity to each other (e.g., within one foot of each other, two feet, etc.). Automatically or based on receipt of an input from one or more of the beverage containers 100, the central server computer system can query the user accounts for each beverage container to identify one or more characteristics associated with the users of the beverage containers. When a commonality is determined, the central server computer system can transmit a message to one or both of the beverage containers 100 to cause the electronic displays 115 to show the commonality. The commonality can provide a topic of conversation for the users to engage in to ease the awkward tension that can be common in social situations.

Although the above-description has generally been presented as between two beverage containers 100, it can be appreciated that certain embodiments may provide for an initial social interaction activities amongst all of the beverage containers at a gathering. As one example, the central server computer system can query the user accounts for each of the detected beverage containers at a gathering to determine one or more common features for all of the users. Based on this identified common feature, the central server computer system can transmit one or more messages to all of the beverage containers 100 to provide a more general indication of the commonality. For example, the messages may cause all of the electronic displays 115 of user's from a first city to be a first color with the first city name displayed in text, user's from a second city to be a second color with the second city name displayed in text, and so forth. Accordingly, users at the gathering can readily determine which other users are from the same city by observing the color of their display. A user may use this information to engage in a social interaction with other users.

Figure 2:
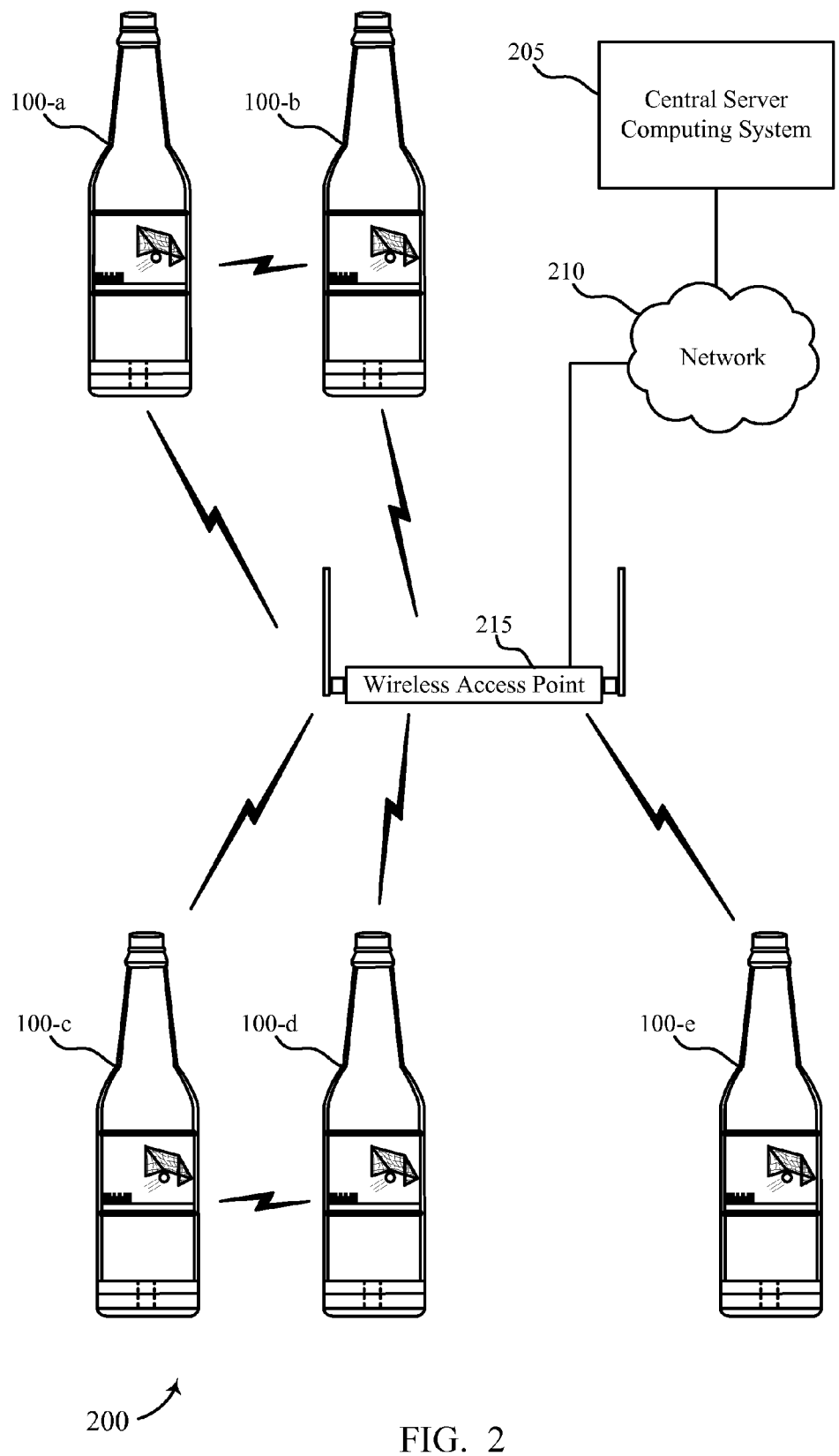
FIG. 2 is a diagram illustrating an example system for communicating with intelligent beverage containers according to various embodiments of the invention.

FIG. 2 is a block diagram of an example system 200 in which a number of intelligent beverage containers 100 may communicate with a central server computer system 205 over network 210 and one or more wireless access points 215. The system 200 may be used to enable communication between beverage containers 100 and allow the central server computer system 205 to implement social interaction activities among users of different beverage containers 100 based on communication with the beverage containers 100. In the illustrative example shown in FIG. 2, the system 200 may be used to allow the central server computer system 205 to change the information being displayed on the beverage containers 100 based on real-time activities occurring at a gathering (e.g., based on a team scoring a goal).

The beverage containers 100 may each have a WLAN transceiver that can establish a Wi-Fi connection to the wireless access point 215. The wireless access point 215 may enable the beverage containers 100 to communicate with each other and with the central server computer system 205 over the network 210. The central server computer system 205 may coordinate social interactions and activities between the users of the beverage containers 100. To coordinate these interactions and activities, the central server computer system 205 may communicate with the individual beverage containers 100 to control the respective electronic displays 115 integrated into each beverage container 100 and display information to enhance the social interactions.

In certain examples, the central server computer system 205 may receive input from the beverage containers 100, including location input, proximity to other beverage containers 100, gestures measured by gyroscopes, and the like. The central server computer system 205 may respond to such input based on one or more rules associated with a social interaction for one or more of the beverage containers 100. Additionally or alternatively, the central server computer system 205 may respond to extrinsic input inferred or received from a source other than the beverage containers 100. Such a response may include displaying special messages on the electronic displays of one or more beverage containers 100, awarding refill or other incentives to users associated with specific beverage containers, or other relevant action.

In certain examples, the individual beverage containers 100 may communicate with each other without going through the wireless access point 215 or the network 210. For example, beverage containers 100-*a* and 100-*b* may communicate directly with each other over an ad-hoc WiFi connection, a Bluetooth connection, an NFC connection, or another type of wireless connection. In certain examples, the beverage containers 100 may be programmed to exchange data or implement social interaction activities on an ad-hoc basis without connection to the network 210 or central server computer system 205.

Figure 3:
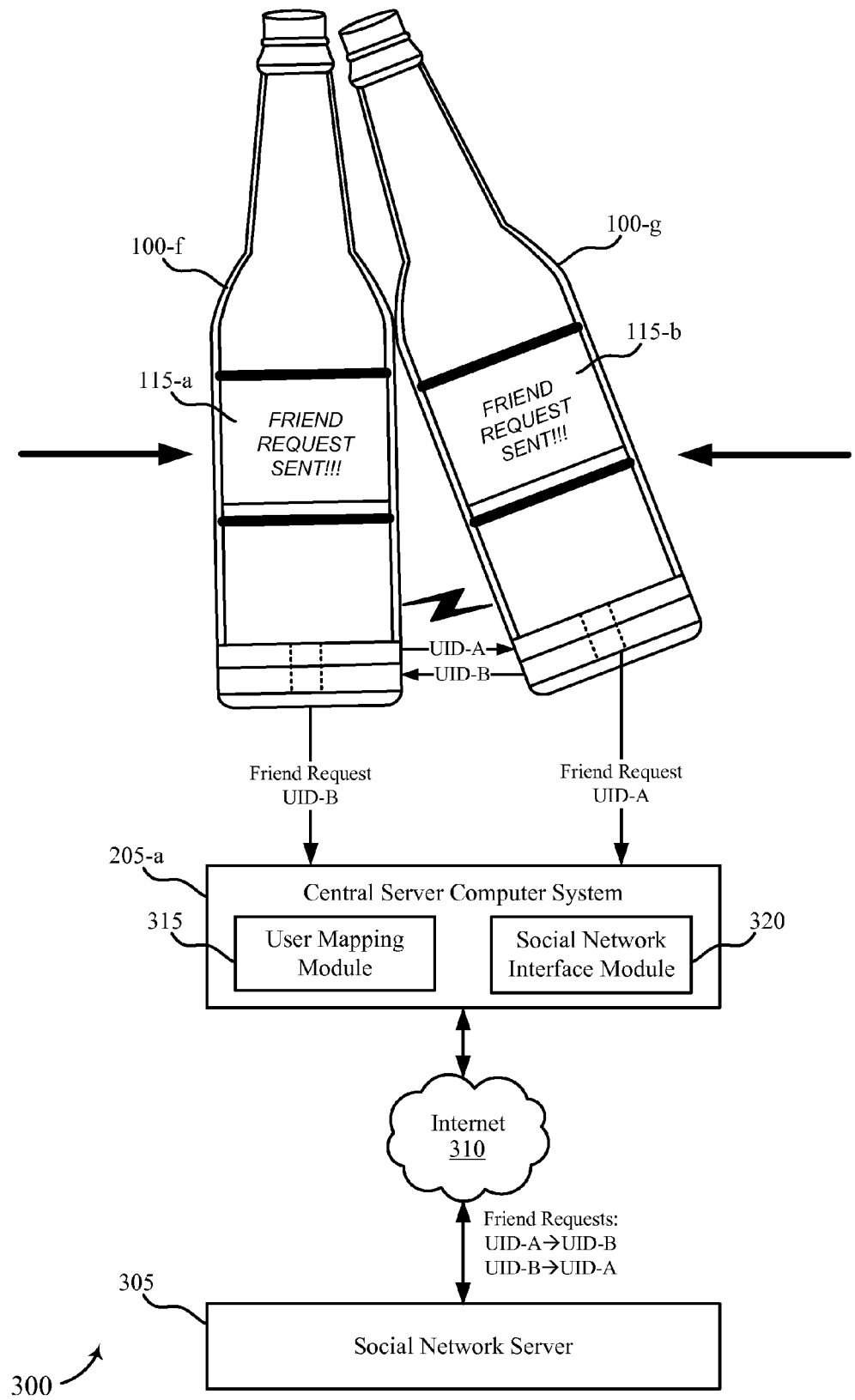
FIG. 3 is a diagram illustrating an example centrally coordinated social interaction system communicating with intelligent beverage containers according to various embodiments of the invention.

FIG. 3 is a diagram of an example system 300 for interactive social activity based on communication between two beverage containers 100 using a central server computer system 205-*a*. The system 300 may include a central server computer system 205-*a* communicatively coupled with a number of intelligent beverage containers 100 (two beverage container 100-*f* and 100-*g* being shown for clarity). The system 300 may be an example of the systems 200 described above with reference to FIG. 2. The beverage containers 100 of the present example may be examples of the beverage containers 100 described above with reference to previous Figures.

In the present example, a first beverage container 100-*f* and a second beverage container 100-*g* may be in close physical proximity to each other. The first and second beverage containers 100-*g* may communicate with each other via an ad-hoc WiFi connection, a Bluetooth connection, an NFC connection, or any other suitable connection. Additionally, each of the beverage containers 100 may be in communication with a central server computer system 205-*a* through a WiFi or other connection to a network.

In the present example, the beverage containers 100 may be configured to implement an interactive social activity in which users may add each other as friends on an online social network by touching the beverage containers 100 together in a toasting action. Each of the beverage containers 100 may include one or more integrated accelerometers that detect movement made by the beverage container 100. Using the detected movements and/or communication between the beverage containers 100, each beverage container 100 may detect when a toasting action occurs. Before or after the toasting action occurs, the beverage containers 100 may communicate to exchange user IDs associated with each beverage container 100. For example, if beverage container 100-*f* is associated with user ID A and beverage container 100-*g* is associated with user ID B, beverage container 100-*f* may transmit user ID A to beverage container 100-*g* and beverage container 100-*g* may transmit user ID B to beverage container 100-*f*.

When the toasting action occurs, each beverage container 100 may transmit the received user ID to the central server computer system 205-*a* with an express or implied request to add the user associated with the received user ID as a friend on an online social network. Thus, in the present example, beverage container 100-*f* may transmit user ID B to the central server computer system 205-*a*, and beverage container 100-*g* may transmit user ID A to the central server computer system 205-*a*. A user mapping module 315 of the central server computer system 205-*a* may look up an online social network account associated with each received user ID, and a social network interface module 320 may communicate with a social network server 305 over the Internet 310 to perform the requested friend requests. The curved electronic display 115 of each beverage container 100 may display a message indicating that a friend request has been sent.

Figure 4:
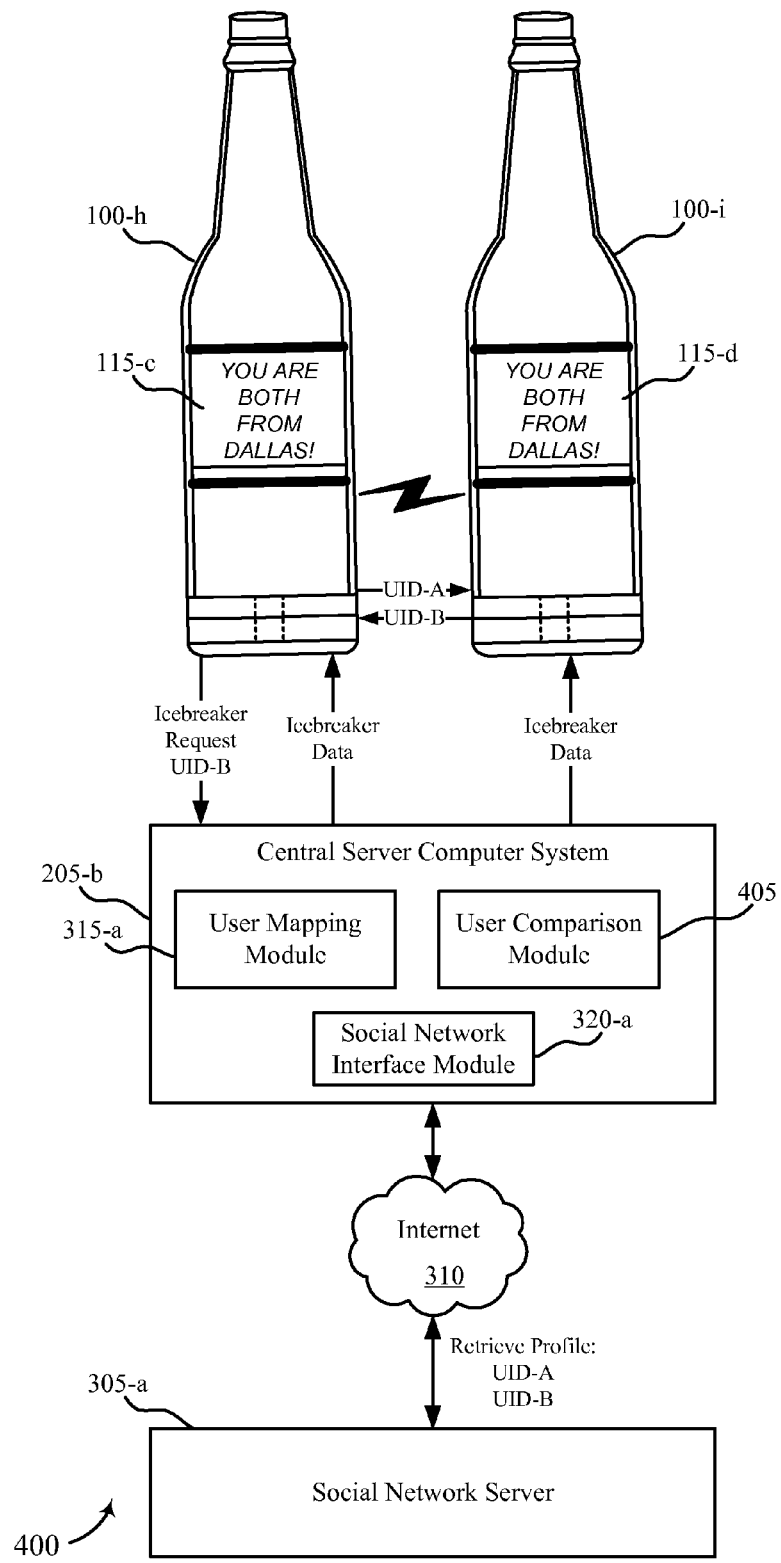
FIG. 4 is a diagram illustrating another example centrally coordinated social interaction system communicating with intelligent beverage containers according to various embodiments of the invention.

FIG. 4 is a diagram of another example system 400 for conducting interactive social activities based on communication between two beverage containers 100 using a central server computer system 205-*b*. The system 400 may include a central server computer system 205-*b* communicatively coupled with a number of intelligent beverage containers 100. The system 400 may be an example of the systems 200 and/or 300 described above with reference to FIGS. 2-3. The beverage containers 100 of the present example may be examples of the beverage containers 100 described above with reference to previous Figures.

In the present example, a first beverage container 100-*h* and a second beverage container 100-*i* may be in close physical proximity to each other. The first and second beverage containers 100 may communicate with each other via an ad-hoc WiFi connection, a Bluetooth connection, an NFC connection, or any other suitable connection. Additionally, each of the beverage containers 100 may be in communication with a central server computer system 205-*b* through a WiFi or other connection to a network.

In the present example, each of the beverage containers 100 may be configured to implement an icebreaker activity when that beverage container 100 comes within a threshold distance of another compatible beverage container 100. In certain examples, the threshold distance may be measured by whether the beverage containers 100 are within a range of communication using a certain protocol (e.g., NFC communications) or by a signal strength of communications received from the other beverage container 100. In other examples, the central server computer system 205-*b* may monitor the location of the beverage containers 100 to determine when the beverage containers 100 are in proximity. When the beverage containers 100 come within the threshold proximity of each other, the beverage containers 100 may communicate to exchange user IDs. Each beverage container 100 may then transmit a request for icebreaker data to the central server computer system 205-*b* with the received user ID.

The central server computer system 205-*b* may receive the requests and associate the user IDs with the user accounts and/or user's social network accounts at a user mapping module 315-*a*. A social network interface module 320-*a* of the central server computer system 205-*b* may query a social network server 305-*a* over the Internet 310 to retrieve the social network profiles associated with each user account. A user comparison module 405 may compare the received social network profiles associated with each user account and apply a set of rules to provide icebreaker data to each beverage container. In certain examples, the icebreaker data may be based on commonalities between the accounts. Additionally or alternatively, the icebreaker data may be based on aspects of each profile that are recognized to be conversation starters. The icebreaker data may be transmitted from the central server computer system 205-*b* to each of the beverage containers 100, each of which may display the icebreaker data on its integrated curved electronic display 115.

In the illustrative example shown in FIG. 4, the user comparison module 405, based on information retrieved from the respective user accounts associated with beverage containers 100-*h* and 100-*i*, has determined that the users are both from a common city. Accordingly, the central server computer system 205-*b* has transmitted an icebreaker data via one or more messages to each of the beverage containers 100 to cause the commonality to be displayed on the electronic displays 115.

Figure 5:
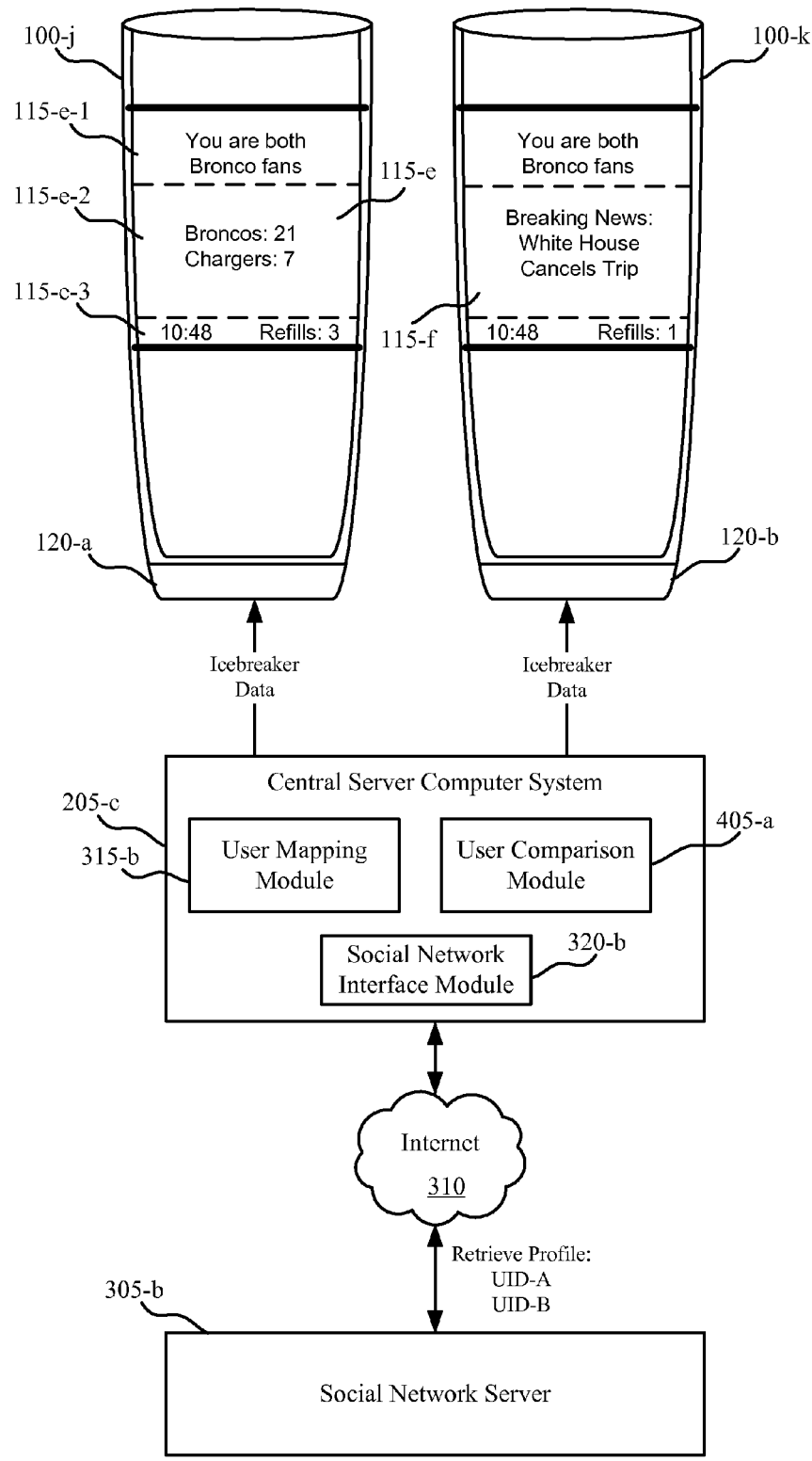
FIG. 5 is a diagram of an example system for interactive social activities using intelligent beverage containers according to various embodiments of the invention.

FIG. 5 is a diagram of another example system 500 for conducting interactive social activities based on communication between two beverage containers 100 using a central server computer system 205-*c*. The system 500 may include a central server computer system 205-*c* communicatively coupled with a number of intelligent beverage containers 100 (two being shown by way of example). The system 500 may be an example of the systems 200, 300 and/or 400 described above with reference to FIGS. 2-4. The beverage containers 100 of the present example may be examples of the beverage containers 100 described above with reference to previous Figures.

In the present example, a first beverage container 100-*j* and a second beverage container 100-*k* may be in close physical proximity to each other. The central server computer system 205-*a* may determine the first and second beverage containers are in proximity to each other. The central server computer system 205-*c* may determine the beverage containers are in proximity to each based on, for example, location information transmitted from each beverage container 100, based on a signal strength receive from, or transmitted to the beverage containers, etc. According to certain examples, the central server computer system 205-*c* may monitor the location of each beverage container 100 within a predefined location to determine which of the beverage containers are in proximity to each other. Each of the beverage containers 100 may be in communication with the central server computer system 205-*c* through a WiFi or other connection to a network.

In the present example, the central server computer system may be configured to implement an icebreaker activity between the beverage container 100-*f* comes within a threshold distance of beverage container 100-*e*. In certain examples, the threshold distance may be measured by whether the beverage containers 100 are within a range of communication using a certain protocol (e.g., NFC communications) or by a signal strength of communications received from the other beverage containers 100. In other examples, the central server computer system 205-*b* may monitor the location of the beverage containers 100 to determine when the beverage containers 100 are in proximity, e.g., based on signal strength levels, triangulation using signals from multiple spatially diverse antennas, etc. When the beverage containers 100 come within the threshold proximity of each other, a user mapping module 315-*b* of the central server computer system 205-*c* may determine a unique ID number associated with each beverage container 100. That is, each beverage container 100 may registered with the central server computer system 205-*c* such that an ID number is associated with each beverage container 100 (e.g., MAC ID, ESN, and the like). For each registered beverage container 100, a social network interface module 320-*b* may store or access a user account associated with the beverage container 100. The user account may be stored in the social network interface module 320-*b* and/or the user account information may be retrieved from a social network server 305-*b* via the Internet 310. According to certain examples, the social network server 305-*b* may be an online social network such as, Facebook, LinkedIn, Instagram, Twitter, and the like.

Based on the beverage containers 100 being in proximity, the central server computer system 205-*c* may initiate a social interaction activity. According to some examples, a user comparison module 405-*a* of the central server computer system 205-*c* may query the user mapping module 315-*b* and/or the social network interface module 320-*b* to identify one or more commonalities between the users of the proximate beverage containers 100. The central server computer system 205-*c* may transmit one or more messages to the beverage containers 100 including the icebreaker data. The beverage containers 100 may utilize the icebreaker data to change the information on the electronic displays 115 to indicate the commonality.

Moreover, FIG. 5 illustrates additional features with respect to the beverage containers 100 and also with respect to how the icebreaker data can be displayed or otherwise communicated to the users. Regarding the beverage container 100, the electronic display 115 may be divided into one or more virtual displays (identified by reference numerals 115-*e*-1, 115-*e*-2, and 115-*e*-3. The central server computer system 250-*c* may transmit one or more messages to the beverage containers 100 during a social interaction event wherein different virtual displays show different information. In the example shown in FIG. 5, a first virtual display 115-*e*-1 may, based on information in the icebreaker data message, display the commonality between the users.

Returning the sporting example, the first virtual display 115-e-1 can indicate that both of the users are supporters of the Denver Broncos football team. A second virtual display 115-e-2 may, based on information in the icebreaker data message or a different message, inform the users about one or more facts related to the shared interest or the user's preferred interest. In the example shown in FIG. 4, the second virtual display of beverage container 100-j displays information related to the common interest whereas the second virtual display of the beverage container 100-k displays information unrelated to the shared interest. The third virtual display 115-e-3 may show static information unrelated to the social interaction, e.g., static information such as a score, a time, a number of refills the user has available, etc.

Figure 6:
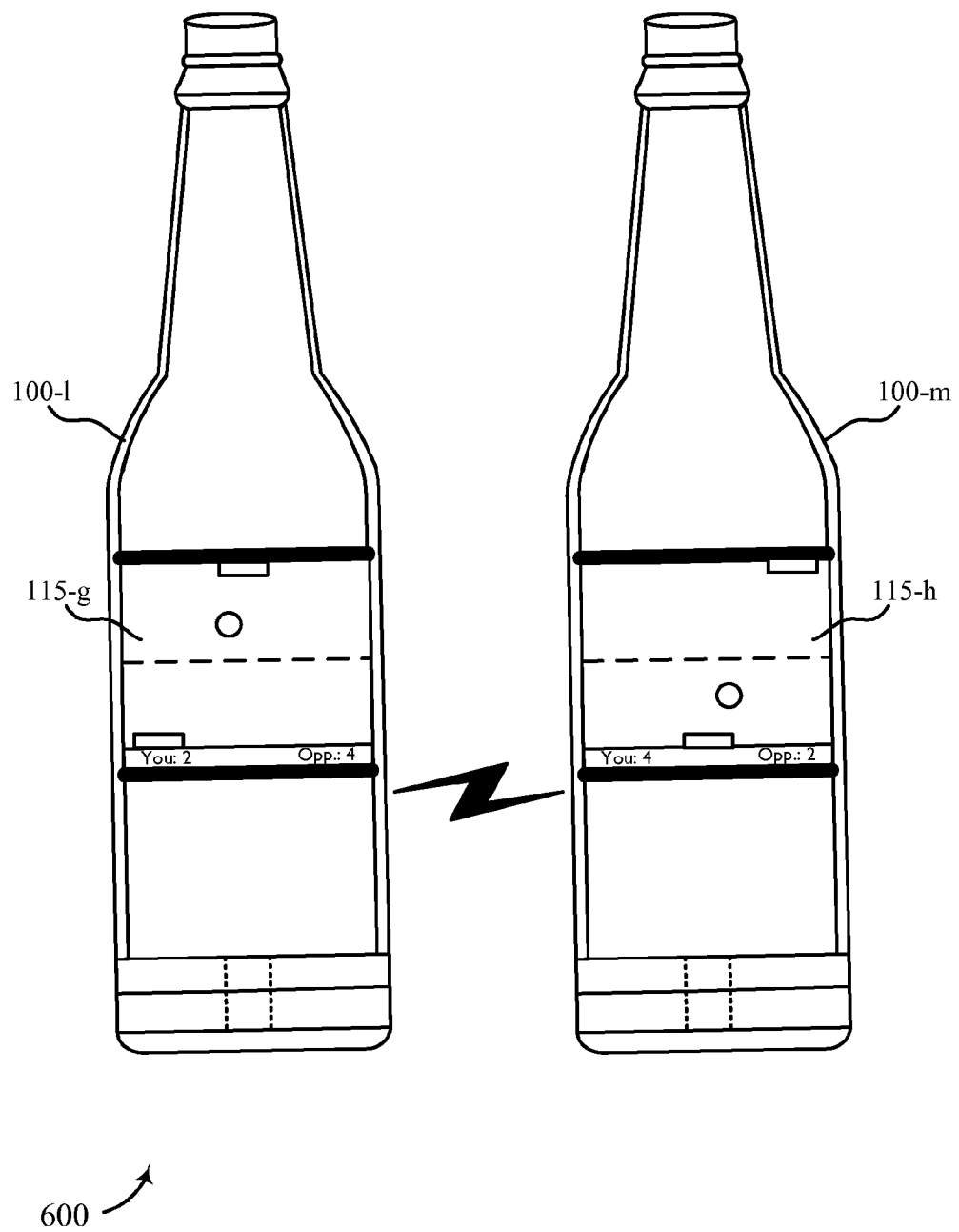
FIG. 6 is a diagram illustrating another example centrally coordinated social interaction system communicating with intelligent beverage containers according to various embodiments of the invention

FIG. 6 is a diagram of another example interactive social activity based on communication between two beverage containers 100. The beverage containers 100 of the present example may be examples of the beverage containers 100 described above with reference to previous Figures. In the present example, a first beverage container 100-1 and a second beverage container 100-m may be in close physical proximity to each other. The first and second beverage containers 100 may communicate with each other via an ad-hoc WiFi connection, a Bluetooth connection, an NFC connection, or any other suitable connection.

In the present example, the beverage containers 100 may communicate with each other to implement an interactive game. Accelerometers or other sensors in each beverage container 100 may translate the motion of that beverage container 100 into movements in the interactive game. Each beverage container 100 may display on its integrated curved electronic display 115 a view of the interactive game from the perspective of the user of that beverage container 100. In additional or alternative examples, multiplayer games may be implemented by a number of beverage containers 100 in communication with each other. Moreover, while the present example illustrates an ad-hoc management of an interactive game by the two beverage containers, an interactive activity such as the interactive game in FIG. 6 may be centrally managed by a server or other external device in communication with one or more of the beverage containers 100.

Figure 7:
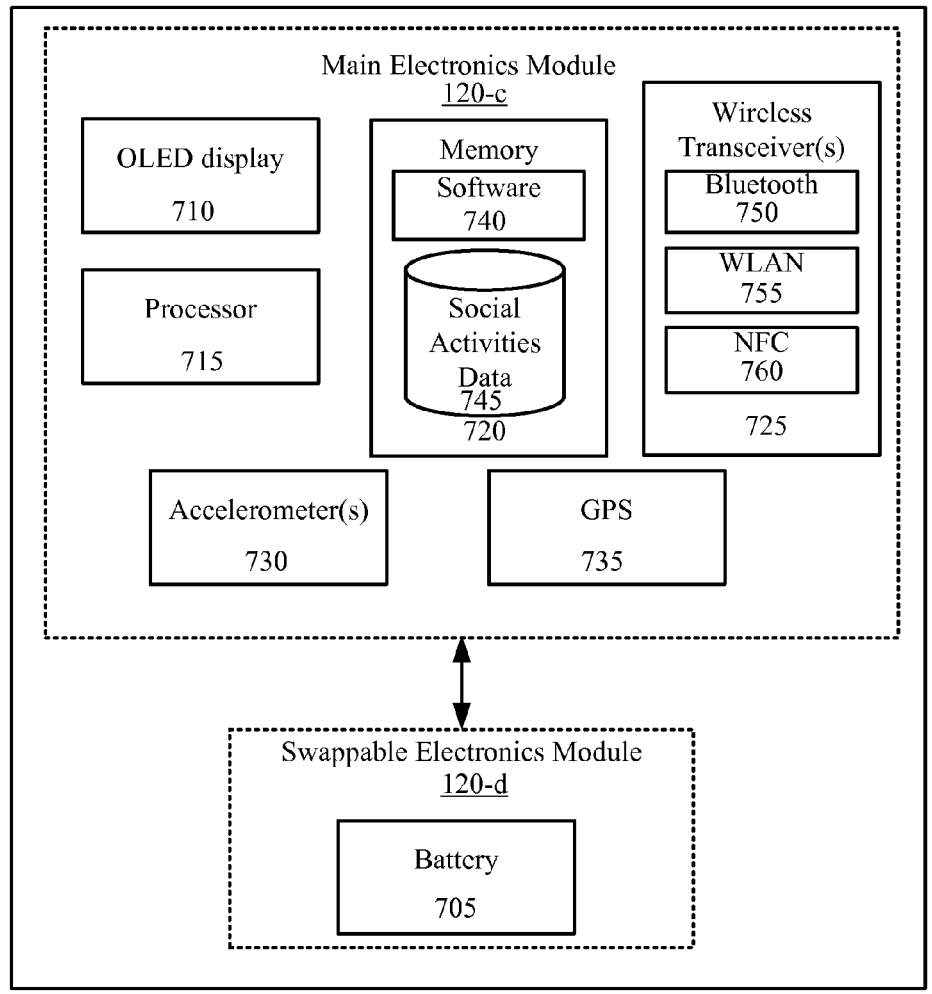
FIG. 7 is a block diagram of an example beverage container configured according to various embodiments of the invention.

FIG. 7 is a block diagram of an example intelligent beverage container 100-n. The beverage container 100-n of the present example may be an example of the beverage containers 100 described above with respect to the previous Figures. The beverage container 100-n of the present example may include a main electronics module 120-c and a swappable electronics module 120-d in communication with each other. The main electronics module 120-c may include circuitry implementing a number of electronic components that are permanently associated with the beverage container 100-n. The swappable electronics module 120-d may include circuitry implementing a number of electronic components that can be interchangeably associated with different beverage containers 100. While the example of FIG. 7 shows only a battery 705 in the swappable electronics module 120-d and all other electronic components in the main electronics module 120-c, each of the electronic components shown in FIG. 7 may be implemented by either the main electronics module 120-c or the swappable electronics module 120-d. In still other examples, only a main electronics module 120-c or a swappable electronics module 120-d may be used to implement all of the electronic components for a beverage container 100-n.

In the present example, the main electronics module 120-c may include an OLED display 710 integrated into the beverage container 100-n as described above with respect to FIG. 1. Alternatively, the beverage container 100-n may include another type of flexible or curved electronic display. The main electronics module 120-c may further include a processor 715 and a memory 720. The processor 715 may execute software 740 stored in the memory 720 to control the OLED display 710, track data about the use of the beverage container, implement social interaction activities, and the like. The memory 720 may store social interaction data 745 containing information and other data for communicating with a central server computer system or other beverage containers 100 to implement social interaction activities among a number of beverage containers 100. The wireless transceiver(s) 725 may include one or more of a Bluetooth transceiver 750, a WLAN transceiver 755, an NFC transceiver 760, or other types of transceivers that may suit a particular application of the principles of this disclosure.

The main electronics module 120-c may further include one or more accelerometers 730 to detect movement of the bottle, a GPS module 735 to detect location, and/or other types of motion sensors or input devices. The processor 715 may receive input from these devices and take action based on the input. Additionally or alternatively, the processor 715 may report the input to a network server and receive instructions from the network server based on the input.

Figure 8:
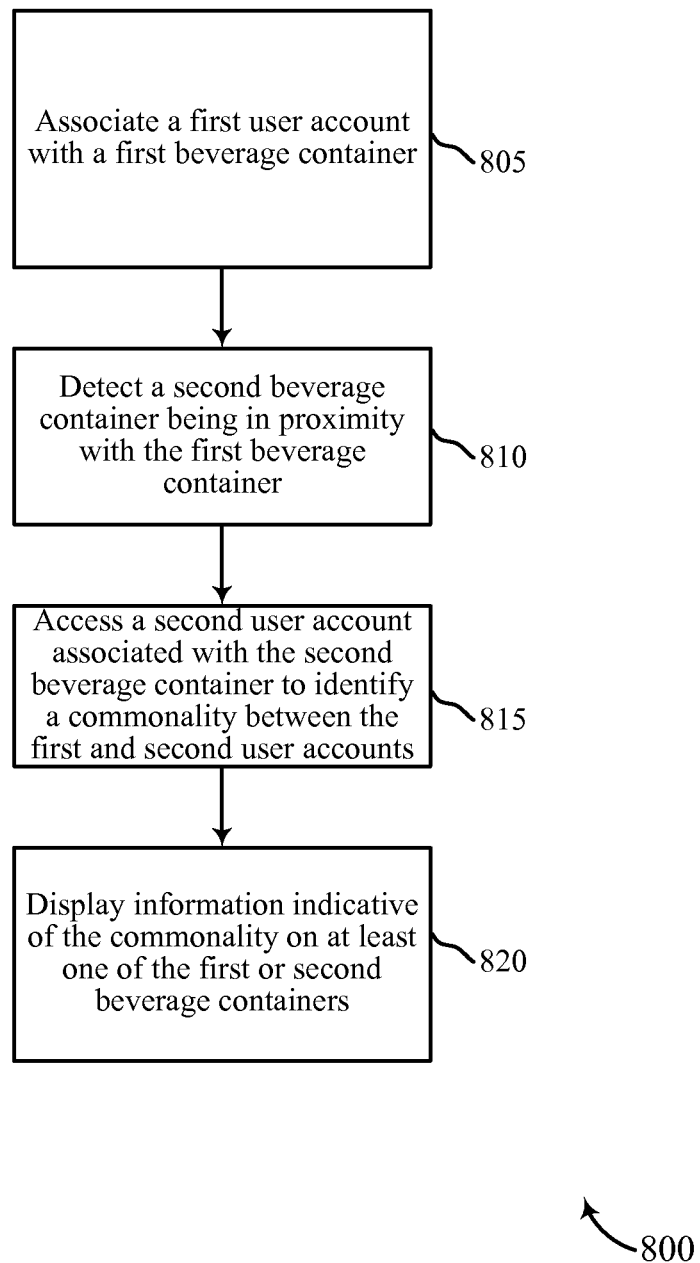
FIG. 8 is a flowchart diagram of an example method for social interaction activities according to various embodiments of the invention.

FIG. 8 is a flowchart of a method 800 for social interaction activities in accordance with aspects of the present disclosure. Aspects of the method 800 may be performed by one or more of the systems 200, 300, 400, 500, and/or 600 of FIGS. 2-6. In one implementation, the central server computer system may execute one or more sets of codes or computer executable instructions to control the functional elements of the systems 200, 300, 400, 500, and/or 600 to perform aspects of the functions described below. In another implementation, the electronics module 120 of the beverage containers 100 may execute one or more sets of codes or computer executable instructions to control the functional elements of the beverage container 100 to perform aspects of the functions described below.

At block 805, a first user account may be associated with a first beverage container 100. The user account may include objective and/or subjective information stored in a storage medium relating to the user. The user account may be a proprietary database of locally stored information and/or may be linked to an online social network. Objective user data may include, but is not limited to, the user's name, address, contact information, educational history, employment history, etc. Subjective user data may include, but is not limited to, information that can be gleaned from a review of the user's previous activities. As one example, the user account may not have a specific field storing the favorite sports team(s) of the user. However, the user posting, commenting, liking, sharing, etc., on their user account information related to a particular sports team may provide a subjective indication of which sports team the user supports. Moreover, a careful review of the user's previous postings, comments, etc., on their user account about a particular sports team may also reveal a general like (e.g., positive posts) or dislike (e.g., negative posts) for the sports team. As can be appreciated, a wide variety of information may be determined based on the information stored in the user account.

At block 810, a second beverage container may be detected in proximity to the first beverage container. A user account associated with the second beverage container may be accessed at block 820 to identify a commonality between the first and second user accounts. As discussed, subjective and/or objective may be determined to common between the first and second user accounts. At block 820, information indicative of the commonality may be displayed on at least one or the first or second beverage containers. The commonality information displayed on the beverage container(s) may provide a conversational topic to break the ice between the users of the beverage containers.

Figure 9:
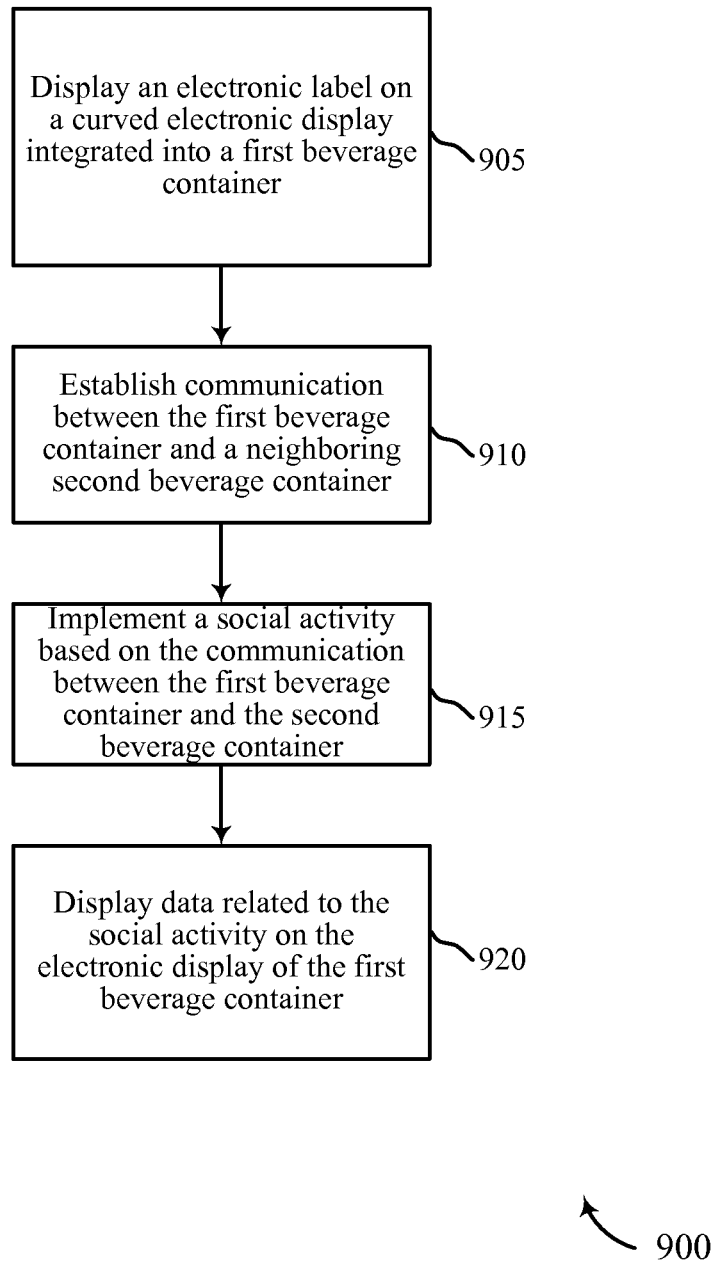
FIG. 9 is a flowchart diagram of an example method for social interaction activities according to various embodiments of the invention.

FIG. 9 is a flowchart of a method 900 for social interaction activities in accordance with aspects of the present disclosure. Aspects of the method 900 may be performed by one or more of the systems 200, 300, 400, 500, and/or 600 of FIGS. 2-6. In one implementation, the central server computer system may execute one or more sets of codes or computer executable instructions to control the functional elements of the systems 200, 300, 400, 500, and/or 600 to perform aspects of the functions described below. In another implementation, the electronics module 120 of the beverage containers 100 may execute one or more sets of codes or computer executable instructions to control the functional elements of the beverage container 100 to perform aspects of the functions described below.

At block 905, an electronic label may be displayed on a curved electronic display integrated into a beverage container. The electronic display 114 may be, in some embodiment, divided into one or more virtual displays where each virtual display shows some or all of the electronic label. At block 910, communication between a first beverage container and a neighboring second beverage container may be established. The communication may be established via a wireless device integrated into each beverage container (e.g., Wireless Local Area Network (WLAN), Radio Frequency Identification (RFID), Near Field Communications (NFC), etc.).

At block 915, a social activity based on the communication between the first and second beverage containers may be implemented. Exemplary social activities may include, but are not limited to, icebreaker activities based on commonalities between users of the beverage containers, connecting the user of the beverage container in an online social network based on their activities, an interactive social game, and the like. Data related to the social activity may be displayed on the electronic display of the first (and/or second) beverage container at block 920.

Figure 10:
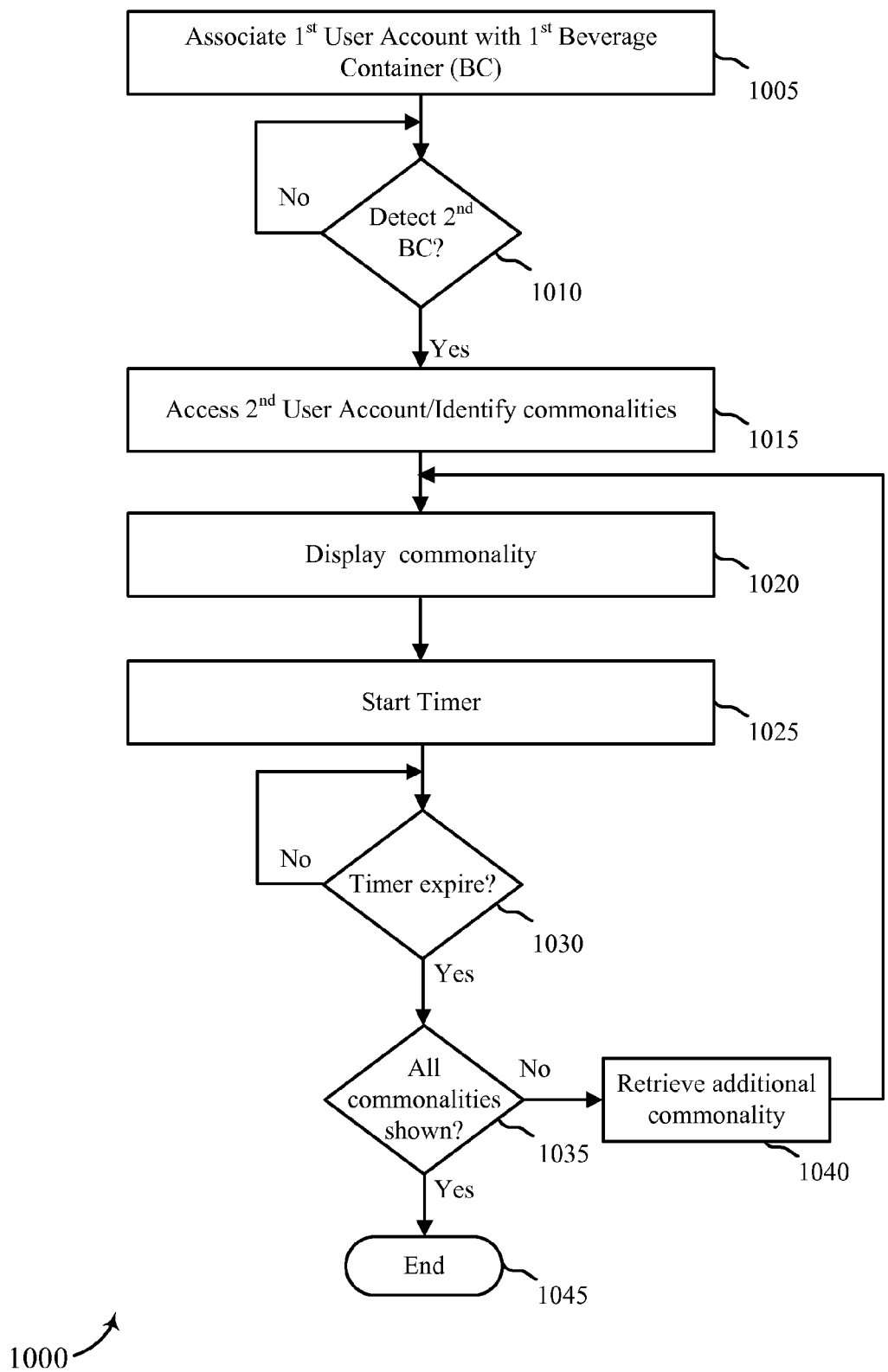
FIG. 10 is a flowchart diagram of an example method for social interaction activities according to various embodiments of the invention.

FIG. 10 is a flowchart of a method 1000 for social interaction activities in accordance with aspects of the present disclosure. Aspects of the method 1000 may be performed by one or more of the systems 200, 300, 400, 500, and/or 600 of FIGS. 2-6. In one implementation, the central server computer system may execute one or more sets of codes or computer executable instructions to control the functional elements of the systems 200, 300, 400, 500, and/or 600 to perform aspects of the functions described below. In another implementation, the electronics module 120 of the beverage containers 100 may execute one or more sets of codes or computer executable instructions to control the functional elements of the beverage container 100 to perform aspects of the functions described below. FIG. 10 generally illustrates an exemplary social interaction wherein additional commonalities are displayed after a predetermined time period.

At block 1005, a first user account may be associated with a first beverage container 100. The user account may include objective and/or subjective information stored in a storage medium relating to the user. A wide variety of information may be stored and/or determined based on the information related to the user account. At block 1010, it may be determined whether a second beverage container has been detected in proximity to the first beverage container. A user account associated with the second beverage container may be accessed at block 1015 to identify a commonality between the first and second user accounts. According to certain embodiments, the user account associated with the second beverage container may be accessed to determine many or all of the common features between the first and second user accounts. As discussed, subjective and/or objective may be determined to common between the first and second user accounts. At block 1020, information indicative of the commonality may be displayed on at least one or the first or second beverage containers. The commonality information displayed on the beverage container(s) may provide a conversational topic to break the ice between the users of the beverage containers.

At block 1025, a timer may be started. The timer may run for a predetermined amount of time, e.g., one minute, five minutes, etc. The timer may indicate a time period the commonality has been displayed on the beverage container. At block 1030, it may be determined whether the timer has expired. If not, the method 1000 may loop back to continue to monitor the timer. If so, the method moves to block 1035 where it may be determined whether all of the commonalities have been displayed. As discussed above, the method may determine a plurality of commonalities between the first and second user accounts. If all of the commonalities have not been displayed, the method moves to block 1040 where additional commonalities may be retrieved. Next, the method returns to block 1020 where the additional commonality may be displayed for a predetermined time period. As can be appreciated, the present method may provide for an enhanced social activity based on providing additional conversation topics between the users of the beverage containers. Once all of the commonalities have been retrieved and displayed, the method may end at block 1045.

Figure 11:
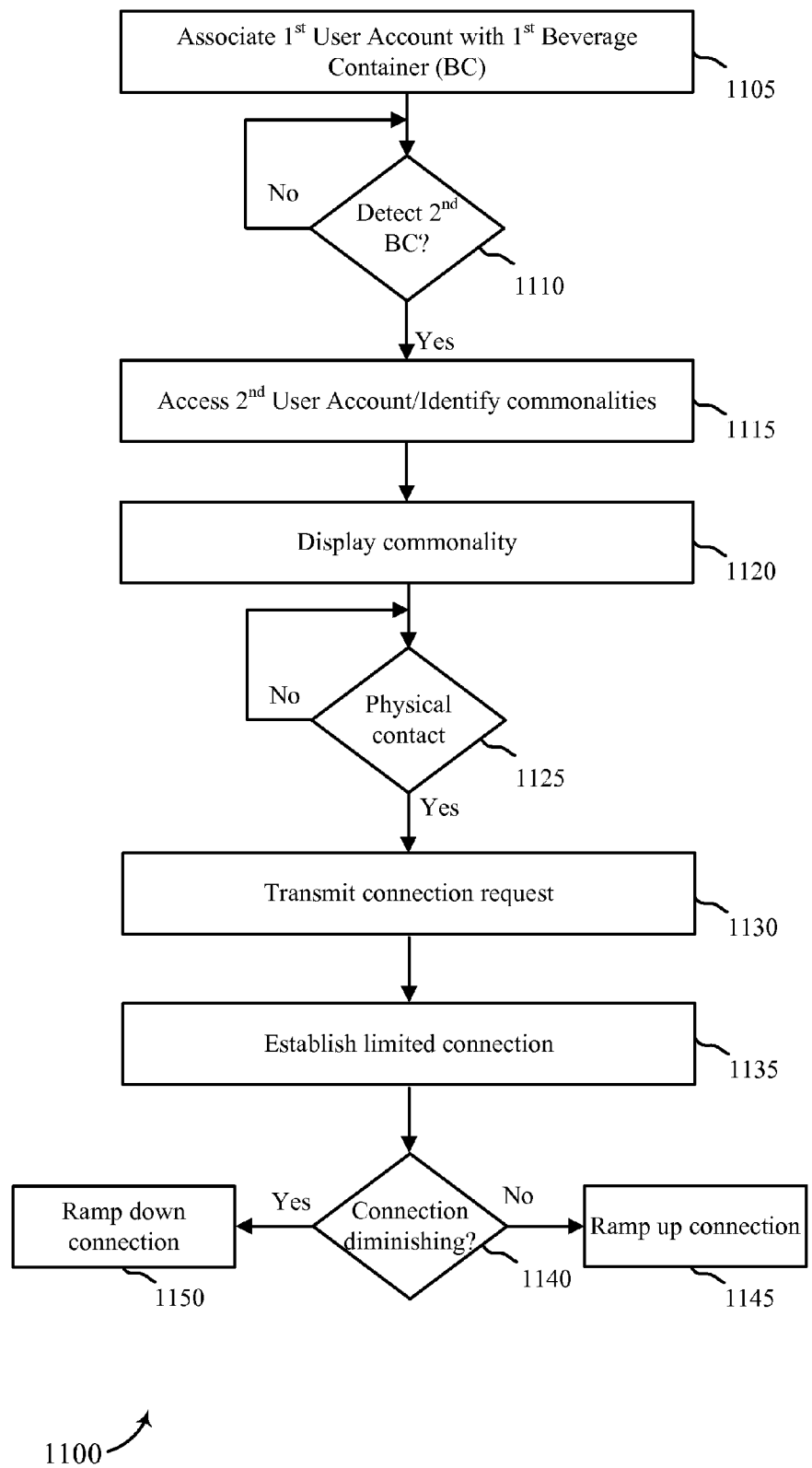
FIG. 11 is a flowchart diagram of an example method for social interaction activities according to various embodiments of the invention.

FIG. 11 is a flowchart of a method 1100 for social interaction activities in accordance with aspects of the present disclosure. Aspects of the method 1100 may be performed by one or more of the systems 200, 300, 400, 500, and/or 600 of FIGS. 2-6. In one implementation, the central server computer system may execute one or more sets of codes or computer executable instructions to control the functional elements of the systems 200, 300, 400, 500, and/or 600 to perform aspects of the functions described below. In another implementation, the electronics module 120 of the beverage containers 100 may execute one or more sets of codes or computer executable instructions to control the functional elements of the beverage container 100 to perform aspects of the functions described below. FIG. 11 generally illustrates an exemplary social interaction wherein, in addition to commonalities being displayed, a connection request is established between the users of the beverage containers. Moreover, once the connection is established, the connection can be ramped up or ramped down based on subsequent activities of the users.

At block 1105, a first user account may be associated with a first beverage container 100. The user account may include objective and/or subjective information stored in a storage medium relating to the user. A wide variety of information may be stored and/or determined based on the information related to the user account. At block 1110, it may be determined whether a second beverage container has been detected in proximity to the first beverage container. A user account associated with the second beverage container may be accessed at block 1115 to identify a commonality between the first and second user accounts. According to certain embodiments, the user account associated with the second beverage container may be accessed to determine many or all of the common features between the first and second user accounts. As discussed, subjective and/or objective may be determined to common between the first and second user accounts. At block 1120, information indicative of the commonality may be displayed on at least one or the first or second beverage containers. The commonality information displayed on the beverage container(s) may provide a conversational topic to break the ice between the users of the beverage containers.

At block 1125, it may be determined whether a physical connection has been made between the first and second beverage containers. According to certain examples, the physical connection may be associated with the users making a toasting gesture with the beverage containers. If a physical connection has been determined, the method moves to block 1130 where a connection request may be transmitted. The connection request may be transmitted to one or more of the user accounts associated with the beverage containers. According to some examples, the connection request may be transmitted to one or more online social networks associated with the user accounts. At block 1135, a limited connection may be established. Generally, a connection may be limited in that only certain information, history, data, etc., are exchanged between the first and second user accounts.

At block 1140, it may be determined whether the connection is diminishing. According to certain examples, a connection may generally be considered to not be diminishing when the users of the first and second beverage containers engage in subsequent social interactions. The social activities, for the purposes of block 1140, may relate to activities conducted by the users using the beverage containers or not using the beverage containers. For instance, if the first and second beverage containers are determined to be proximate to each other on other subsequent occasions, the users may be considered to be engaging in social activities. As another example, if the users subsequently and frequently interact via the user accounts (e.g., on an online social network), their connection may not be considered diminishing. Similarly, if the users do not engage in any subsequent social activities, their connection may be considered to be diminishing.

If the connection is determined to not be diminishing, the connection may be ramped up at block 1145. A connection may be ramped up by sharing additional information, making the connection publicly available, etc. If the connection is determined to be diminishing, the connection may be ramped down at block 1150. Generally, a connection may be ramped down by removing information previously shared via the connection. According to certain examples, a connection may be ramped down by removing the connection. As can be appreciated, the diminishing connection feature described herein may provide additional privacy to the users of the beverage containers.

Figure 12:
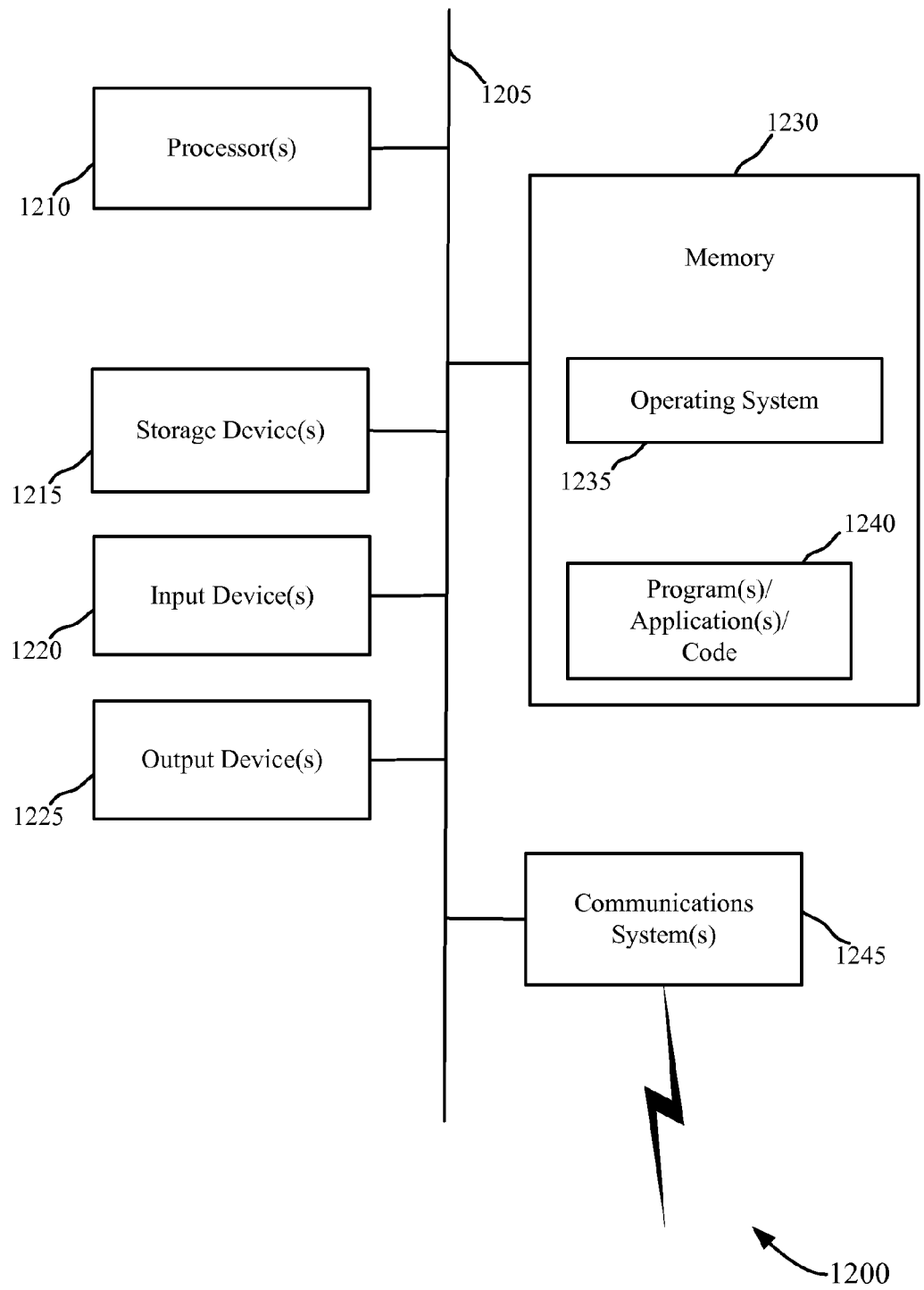
FIG. 12 is a schematic diagram that illustrates a representative device structure that may be used in various embodiments of the present invention.

A device structure 1200 that may be used for a beverage container 100, a central server computer system 205, or other computing devices described herein, is illustrated with the schematic diagram of FIG. 12. This drawing broadly illustrates how individual system elements of each of the aforementioned devices may be implemented, whether in a separated or more integrated manner. The exemplary structure is shown comprised of hardware elements that are electrically coupled via bus 1205, including processor(s) 1210 (which may further comprise a DSP or special-purpose processor), storage device(s) 1215, input device(s) 1220, and output device(s) 1225. The storage device(s) 1215 may be a machine-readable storage media reader connected to any machine-readable storage medium, the combination comprehensively representing remote, local, fixed, or removable storage devices or storage media for temporarily or more permanently containing computer-readable information. The communications systems interface 1245 may interface to a wired, wireless, or other type of interfacing connection that permits data to be exchanged with other devices. The communications system(s) interface 1245 may permit data to be exchanged with a network.

The structure 1200 may also include additional software elements, shown as being currently located within working memory 1230, including an operating system 1235 and other code 1240, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method comprising:
    detecting, using at least one accelerometer of a first beverage container associated with a first user account, that a two-party triggering action has been performed by the first beverage container and a second beverage container associated with a second user account, the two-party triggering action occurring while the second beverage container is within a threshold distance of the first beverage container;
    transmitting, by the first beverage container and based on the detected two-party triggering action, a first user identifier associated with the first beverage container to the second beverage container over a direct wireless connection between the first beverage container and the second beverage container;
    receiving, by the first beverage container and based on the detected two-party triggering action, a second user identifier associated with the second beverage container over the direct wireless connection; and
    transmitting, by the first beverage container and based on the detected two-party triggering action, a connection request comprising the received second user identifier to a server to establish a social media connection between the first user account and the second user account.

2. The method of claim 1, wherein detecting that the two-party triggering action has been performed by the first beverage container and the second beverage container comprises:
    detecting the first and second beverage containers being in substantial physical contact with each other.

3. The method of claim 2, wherein the connection request is a friend request via an online social network.

4. The method of claim 2, further comprising:
    receiving a limited portion of information about a second user associated with the second user account.

5. The method of claim 1, wherein the first and second user accounts are associated with one or more online social networks.

6. The method of claim 1, further comprising:
    displaying information indicative of at least one of the additional commonalities on at least the first beverage container.

7. The method of claim 6, wherein the information indicative of the additional commonalities is displayed after a predetermined time period of the first and second beverage containers being within the threshold distance of each other.

8. The method of claim 6, further comprising:
    updating the display of information indicative of the additional commonalities to illustrate a different commonality after a predetermined time period.

9. The method of claim 1, wherein the commonality comprises one or more of a home town, a visited location, an acquaintance, a school, a sports team, a present or former employer, an organization membership, an interest, a common activity, a membership in an online social network, a beverage choice, or a purchase history.

10. The method of claim 1, wherein detecting that the two-party triggering action has been performed comprises detecting the second beverage container via a wireless signal.

11. The method of claim 10, wherein the wireless signal is transmitted via a wireless communications module in each of the first and second beverage containers.

12. A first beverage container apparatus comprising:
    at least one accelerometer;
    a wireless transceiver;
    a processor;
    a memory in electronic communication with the processor; and
    instructions being executable by the processor to,
        detect, using the at least one accelerometer, that a two-party triggering action has been performed by the first beverage container and a second beverage container associated with a second user account, the two-party triggering action occurring while the second beverage container is within a threshold distance of the first beverage container, wherein the first beverage container is associated with a first user account;
        transmit, based on the detected two-party triggering action, a first user identifier associated with the first beverage container to the second beverage container using the wireless transceiver over a direct wireless connection between the first beverage container and the second beverage container;
        receive, based on the detected two-party triggering action, a second user identifier associated with the second beverage container over the direct wireless connection using the wireless transceiver; and
        transmit, based on the detected two-party triggering action, a connection request comprising the received second user identifier to a server using the wireless transceiver to establish a social media connection between the first user account and the second user account.

13. The first beverage container of claim 12, wherein detecting that the two-party triggering action has been performed by the first beverage container and the second beverage container comprises:
    detecting the first and second beverage containers being in substantial physical contact with each other.

14. The first beverage container of claim 13, wherein connecting the second user account with the first user account shares a limited portion of information about a first user associated with the first user account with a second user associated with the second user account.

15. The first beverage container of claim 12, wherein the first and second user accounts are associated with one or more online social networks.

16. The first beverage container of claim 12, further comprising:
- a display communicatively coupled with the processor;
- wherein the instructions are further executable by the processor to:
- display information indicative of at least one of the additional commonalities on the display.

* * * * *